(12) United States Patent
Shipman et al.

(10) Patent No.: US 11,341,531 B2
(45) Date of Patent: May 24, 2022

(54) SYSTEM AND METHOD FOR CONTEXTUAL ADVERTISING AND MERCHANDIZING BASED ON USER CONFIGURABLE PREFERENCES

(71) Applicant: eBay Inc., San Jose, CA (US)

(72) Inventors: Scott Robert Shipman, San Jose, CA (US); Aaron K. Forth, San Francisco, CA (US)

(73) Assignee: eBay Inc., San Jose, CA (US)

( * ) Notice: Subject to any disclaimer, the term of this patent is extended or adjusted under 35 U.S.C. 154(b) by 98 days.

(21) Appl. No.: 13/974,764

(22) Filed: Aug. 23, 2013

(65) Prior Publication Data
US 2014/0006154 A1 Jan. 2, 2014

Related U.S. Application Data

(63) Continuation of application No. 11/774,671, filed on Jul. 9, 2007, now abandoned.

(51) Int. Cl.
*G06Q 30/00* (2012.01)
*G06Q 30/02* (2012.01)

(52) U.S. Cl.
CPC ..... *G06Q 30/0257* (2013.01); *G06Q 30/0269* (2013.01)

(58) Field of Classification Search
None
See application file for complete search history.

(56) References Cited

U.S. PATENT DOCUMENTS

| | | | |
|---|---|---|---|
| 5,761,662 A * | 6/1998 | Dasan | G06F 16/10 707/999.009 |
| 5,948,061 A | 9/1999 | Merriman et al. | |
| 6,009,410 A * | 12/1999 | LeMole | G06Q 30/0256 707/999.102 |
| 6,026,368 A * | 2/2000 | Brown | G06Q 30/0257 709/224 |
| 6,615,209 B1 | 9/2003 | Gomes et al. | |
| 6,758,397 B2 | 7/2004 | Catan | |
| 6,868,525 B1 | 3/2005 | Szabo | |

(Continued)

FOREIGN PATENT DOCUMENTS

| AU | 2007269597 B2 | 5/2011 |
|---|---|---|
| AU | 2008275636 B2 | 11/2011 |

(Continued)

OTHER PUBLICATIONS

Sugiyama, Kazunari, et al. "Adaptive Web Search Based on User Profile Constructed without Any Effort by Users." WWW2004, May 17-22, New York, New York, 2004. pp. 675-684. (Year: 2004).*

(Continued)

*Primary Examiner* — Luis A Brown
(74) *Attorney, Agent, or Firm* — FIG. 1 Patents (57) ABSTRACT

A computer-implemented system and method for contextual advertising and merchandizing based on user configurable preferences is disclosed. The system in an example embodiment includes an advertising (ad) preferences service to obtain user preference information related to advertising, enable user configuration of the user preference information related to advertising, and modify the presentation of advertising to the user based upon the user configured preference information.

20 Claims, 8 Drawing Sheets

(56) References Cited

U.S. PATENT DOCUMENTS

| | | |
|---|---|---|
| 6,907,566 B1 | 6/2005 | McElfresh et al. |
| 6,981,040 B1 | 12/2005 | Konig et al. |
| 7,089,195 B2 | 8/2006 | Rosenberg |
| 7,107,535 B2 | 9/2006 | Cohen et al. |
| 7,167,863 B2 | 1/2007 | Ellis et al. |
| 7,181,438 B1 | 2/2007 | Szabo |
| 7,406,436 B1 | 7/2008 | Reisman |
| 7,478,089 B2 | 1/2009 | Henkin et al. |
| 7,587,357 B1 | 9/2009 | Buck |
| 7,676,394 B2 | 3/2010 | Ramer et al. |
| 7,711,735 B2 * | 5/2010 | Wu ............... G06F 16/9535 707/737 |
| 7,725,840 B2 | 5/2010 | Cohen et al. |
| 7,822,745 B2 | 10/2010 | Fayyad |
| 7,831,586 B2 | 11/2010 | Reitter et al. |
| 8,001,105 B2 | 8/2011 | Bolivar et al. |
| 8,200,662 B2 | 6/2012 | Reitter et al. |
| 8,209,320 B2 | 6/2012 | Reitter |
| 8,484,142 B2 * | 7/2013 | Pinckney ............ G06N 20/00 706/12 |
| 8,494,978 B2 * | 7/2013 | Pinckney ............ G06Q 50/01 706/11 |
| 8,666,909 B2 * | 3/2014 | Pinckney ......... G06F 16/9535 706/11 |
| 9,159,034 B2 * | 10/2015 | Pinckney ............. G06N 5/04 |
| 10,621,240 B2 | 4/2020 | Reitter et al. |
| 2002/0120506 A1 * | 8/2002 | Hagen ............ G06Q 30/0242 705/14.41 |
| 2002/0123928 A1 * | 9/2002 | Eldering ........... H04N 21/4532 348/E7.071 |
| 2002/0128925 A1 | 9/2002 | Angeles |
| 2002/0143744 A1 | 10/2002 | Teng et al. |
| 2002/0174174 A1 | 11/2002 | Ramraj et al. |
| 2002/0188551 A1 | 12/2002 | Grove et al. |
| 2003/0001880 A1 | 1/2003 | Holtz et al. |
| 2003/0001887 A1 * | 1/2003 | Smith, IV ......... G06F 16/9535 715/741 |
| 2003/0110131 A1 | 6/2003 | Alain et al. |
| 2003/0171977 A1 | 9/2003 | Singh et al. |
| 2004/0024981 A1 | 2/2004 | Iwatsu et al. |
| 2004/0039733 A1 | 2/2004 | Soulanille |
| 2004/0070620 A1 | 4/2004 | Fujisawa |
| 2004/0083133 A1 | 4/2004 | Nicholas et al. |
| 2004/0143465 A1 | 7/2004 | Imanishi |
| 2004/0163107 A1 | 8/2004 | Crystal |
| 2004/0249816 A1 | 12/2004 | Tada |
| 2004/0267561 A1 | 12/2004 | Meshkin et al. |
| 2005/0004903 A1 | 1/2005 | Tsuda |
| 2005/0004948 A1 | 1/2005 | Navar et al. |
| 2005/0033641 A1 | 2/2005 | Jha et al. |
| 2005/0096980 A1 * | 5/2005 | Koningstein ......... G06Q 30/00 705/14.69 |
| 2005/0154746 A1 | 7/2005 | Liu et al. |
| 2005/0229224 A1 | 10/2005 | Matsumoto et al. |
| 2005/0256783 A1 | 11/2005 | Ettinger, Jr. |
| 2006/0004724 A1 | 1/2006 | Tabata et al. |
| 2006/0020596 A1 | 1/2006 | Liu et al. |
| 2006/0026013 A1 | 2/2006 | Kraft |
| 2006/0069611 A1 | 3/2006 | Litt et al. |
| 2006/0085399 A1 | 4/2006 | Carmel et al. |
| 2006/0106709 A1 | 5/2006 | Chickering et al. |
| 2006/0111971 A1 | 5/2006 | Salesin et al. |
| 2006/0242243 A1 | 10/2006 | Matsumoto et al. |
| 2006/0259360 A1 * | 11/2006 | Flinn ............... G06Q 30/0261 705/14.71 |
| 2006/0271438 A1 | 11/2006 | Shotland et al. |
| 2007/0043583 A1 | 2/2007 | Davulcu et al. |
| 2007/0061837 A1 * | 3/2007 | Dadush ............ G06Q 30/02 348/E7.071 |
| 2007/0073704 A1 | 3/2007 | Bowden et al. |
| 2007/0079326 A1 | 4/2007 | Datta et al. |
| 2007/0094081 A1 * | 4/2007 | Yruski .............. G06Q 30/0275 705/14.66 |
| 2007/0100803 A1 | 5/2007 | Cava et al. |
| 2007/0146812 A1 * | 6/2007 | Lawton ............... G06Q 30/02 358/452 |
| 2007/0157227 A1 | 7/2007 | Carpenter et al. |
| 2007/0214252 A1 * | 9/2007 | Kushima ........... G06F 17/30194 709/223 |
| 2007/0244750 A1 * | 10/2007 | Grannan ........... G06Q 30/0258 705/14.56 |
| 2007/0250468 A1 | 10/2007 | Pieper |
| 2007/0265979 A1 * | 11/2007 | Hangartner ......... G06Q 30/02 705/59 |
| 2007/0288431 A1 | 12/2007 | Reitter et al. |
| 2007/0288454 A1 | 12/2007 | Bolivar et al. |
| 2007/0288514 A1 | 12/2007 | Reitter et al. |
| 2007/0300152 A1 * | 12/2007 | Baugher ........... G06Q 30/0258 705/14.56 |
| 2008/0022300 A1 * | 1/2008 | Angiolillo ......... H04N 7/17318 725/32 |
| 2008/0033770 A1 | 2/2008 | Barth et al. |
| 2008/0040218 A1 | 2/2008 | van Dijk et al. |
| 2008/0059258 A1 | 3/2008 | Woo |
| 2008/0092159 A1 * | 4/2008 | Dmitriev ........... H04N 21/6582 725/35 |
| 2008/0183596 A1 | 7/2008 | Nash et al. |
| 2008/0189169 A1 | 8/2008 | Turpin et al. |
| 2008/0221987 A1 | 9/2008 | Sundaresan et al. |
| 2008/0250452 A1 | 10/2008 | Iwamoto |
| 2008/0259906 A1 * | 10/2008 | Shkedi .............. G06F 16/248 370/352 |
| 2008/0288354 A1 * | 11/2008 | Flinn ............... G06Q 30/0267 705/14.66 |
| 2008/0300972 A1 * | 12/2008 | Pujara ................ G06Q 30/02 705/14.55 |
| 2009/0007195 A1 * | 1/2009 | Beyabani ......... H04N 21/8456 725/86 |
| 2009/0018904 A1 * | 1/2009 | Shipman ........... G06Q 30/0257 705/14.66 |
| 2009/0070267 A9 * | 3/2009 | Hangartner ......... G06Q 30/02 705/59 |
| 2009/0177531 A1 | 7/2009 | Dijk et al. |
| 2009/0177546 A1 | 7/2009 | Dijk et al. |
| 2009/0234711 A1 | 9/2009 | Ramer et al. |
| 2010/0076845 A1 | 3/2010 | Ramer et al. |
| 2011/0015991 A1 | 1/2011 | Fayyad et al. |
| 2011/0055195 A1 | 3/2011 | Reitter et al. |
| 2011/0218866 A1 * | 9/2011 | Wilson ............... G06Q 30/02 705/14.73 |
| 2011/0313852 A1 | 12/2011 | Kon et al. |
| 2012/0117485 A1 | 5/2012 | Brindley et al. |
| 2012/0254151 A1 | 10/2012 | Reitter et al. |

FOREIGN PATENT DOCUMENTS

| | | |
|---|---|---|
| KR | 20020017331 | 3/2002 |
| KR | 20050123236 | 12/2005 |
| KR | 101290006 B1 | 7/2013 |
| WO | WO-0208854 A2 | 1/2002 |
| WO | WO-2006128104 A2 | 11/2006 |
| WO | WO-2007052285 A2 | 5/2007 |
| WO | WO-2007145775 A2 | 12/2007 |
| WO | WO-2007145775 A3 | 12/2007 |
| WO | WO-2008005502 A2 | 1/2008 |
| WO | WO-2008005502 A3 | 1/2008 |
| WO | WO-2009009073 A1 | 1/2009 |

OTHER PUBLICATIONS

"U.S. Appl. No. 11/773,673, Non Final Office Action dated Nov. 12, 2013", 21 pgs.

"U.S. Appl. No. 11/773,673, Response filed May 12, 2014 to Non Final Office Action dated Nov. 12, 2013", 12 pgs.

"U.S. Appl. No. 12/347,887, Non Final Office Action dated Nov. 25, 2013", 14 pgs.

"U.S. Appl. No. 12/347,887, Response filed Apr. 25, 2014 to Non Final Office Action dated Nov. 25, 2013", 12 pgs.

"U.S. Appl. No. 12/347,893, Final Office Action dated Jun. 6, 2014", 13 pgs.

(56) References Cited

OTHER PUBLICATIONS

"U.S. Appl. No. 12/347,893, Non Final Office Action dated Nov. 13, 2013", 13 pgs.
"U.S. Appl. No. 12/347,893, Response filed Apr. 14, 2014 to Non Final Office Action dated Nov. 13, 2013", 12 pgs.
"Canadian Application Serial No. 2,656,935, Office Action dated Feb. 7, 2014", 2 pgs.
"Canadian Application Serial No. 2,693,675, Office Action dated Oct. 21, 2013", 3 pgs.
"Canadian Application Serial No. 2,693,675, Response filed Apr. 17, 2014 to Office Action dated Oct. 21, 2013", 10 pgs.
"European Application Serial No. 11195428.5, Extended European Search Report dated Nov. 6, 2013", 7 pgs.
"European Application Serial No. 11195428.5, Office Action dated Dec. 9, 2013", 2 pgs.
"European Application Serial No. 11195428.5, Response filed Jun. 3, 2014", 14 pgs.
"Statement In Accordance With The Notice From The European Patent Office dated Oct. 1, 2007 Concerning Business Methods", Journal Officiel De L'office Europeen Des Brevets Official Journal of The European Patent Office Amtsblattt Des Europaeischen Patentamts, (Nov. 1, 2007), 592-593.
"U.S. Appl. No. 11/645,946, 312 Amendment filed Aug. 26, 2010", 3 pgs.
"U.S. Appl. No. 11/645,946, Final Office Action dated Jan. 26, 2010", 13 pgs.
"U.S. Appl. No. 11/645,946, Final Office Action dated Nov. 18, 2008", 10 pgs.
"U.S. Appl. No. 11/645,946, Non-Final Office Action dated Apr. 24, 2009", 14 pgs.
"U.S. Appl. No. 11/645,946, Non-Final Office Action dated Jun. 10, 2008", 12 pgs.
"U.S. Appl. No. 11/645,946, Notice of Allowance dated Jul. 26, 2010", 16 pgs.
"U.S. Appl. No. 11/645,946, PTO Response to 312 Amendment dated Sep. 14, 2010", 2 pgs.
"U.S. Appl. No. 11/645,946, Response filed Jan. 18, 2009 to Final Office Action dated Nov. 18, 2009", 14 pgs.
"U.S. Appl. No. 11/645,946, Response filed Jun. 28, 2010 to Non Final Office Action dated Jan. 26, 2010", 15 pgs.
"U.S. Appl. No. 11/645,946, Response filed Jul. 24, 2009 to Non Final Office Action dated Apr. 24, 2009", 14 pgs.
"U.S. Appl. No. 11/645,946, Response filed Sep. 10, 2008 to Non Final Office Action dated Jun. 10, 2008", 17 pgs.
"U.S. Appl. No. 11/646,012 Final Office Action dated Jan. 23, 2009", 12 pgs.
"U.S. Appl. No. 11/646,012, Final Office Action dated Jan. 11, 2010", 16 pgs.
"U.S. Appl. No. 11/646,012, Non-Final Office Action dated Jun. 25, 2008", 10 pgs.
"U.S. Appl. No. 11/646,012, Non-Final Office Action dated Jul. 2, 2009", 13 pgs.
"U.S. Appl. No. 11/646,012, Notice of Allowance dated Apr. 1, 2011", 5 pgs.
"U.S. Appl. No. 11/646,012, Notice of Allowance dated Jul. 21, 2010", 19 pgs.
"U.S. Appl. No. 11/646,012, Notice of Allowance dated Sep. 1, 2010", 4 pgs.
"U.S. Appl. No. 11/646,012, Notice of Allowance dated Dec. 13, 2010", 4 pgs.
"U.S. Appl. No. 11/646,012, Response filed Apr. 23, 2009 to Final Office Action dated Jan. 23, 2009", 14 pgs.
"U.S. Appl. No. 11/646,012, Response filed Jun. 11, 2010 to Final Office Action dated Jan. 11, 2010", 13 pgs.
"U.S. Appl. No. 11/646,012, Response filed Oct. 2, 2009 to Non Final Office Action dated Jul. 2, 2009", 14 pgs.
"U.S. Appl. No. 11/646,012, Response filed Oct. 27, 2008 to Non-Final Office Action dated Jun. 25, 2008", 24 pgs.
"U.S. Appl. No. 11/646,039, Non-Final Office Action dated Aug. 17, 2010", 15 pgs.
"U.S. Appl. No. 11/646,039, Examiner Interview Summary dated Nov. 14, 2011", 1 pg.
"U.S. Appl. No. 11/646,039, Final Office Action dated Jan. 13, 2010", 15 pgs.
"U.S. Appl. No. 11/646,039, Final Office Action dated Jan. 8, 2009", 11 pgs.
"U.S. Appl. No. 11/646,039, Final Office Action dated Mar. 30, 2011", 15 pgs.
"U.S. Appl. No. 11/646,039, Non-Final Office Action dated Jun. 27, 2008", 11 pgs.
"U.S. Appl. No. 11/646,039, Non-Final Office Action dated Jul. 6, 2009", 15 pgs.
"U.S. Appl. No. 11/646,039, Notice of Allowance dated Feb. 27, 2012", 5 pgs.
"U.S. Appl. No. 11/646,039, Notice of Allowance dated Nov. 14, 2011", 17 pgs.
"U.S. Appl. No. 11/646,039, Response filed Oct. 27, 2008 to Non-Final Office Action dated Jun. 27, 2008", 11 pgs.
"U.S. Appl. No. 11/646,039, Response filed Nov. 5, 2009 to Non Final Office Action dated Jul. 6, 2009", 11 pgs.
"U.S. Appl. No. 11/646,039, Response filed Dec. 17, 2010 to Non Final Office Action dated Aug. 17, 2010", 11 pgs.
"U.S. Appl. No. 11/646,039, Response filed May 8, 2009 to Final Office Action dated Jan. 8, 2009", 12 pgs.
"U.S. Appl. No. 11/646,039, Response filed Jun. 14, 2010 to Final Office Action dated Jan. 13, 2010", 13 pgs.
"U.S. Appl. No. 11/646,039, Response filed Aug. 30, 2011 to Final Office Action dated Mar. 30, 2011", 12 pgs.
"U.S. Appl. No. 11/701,019, Advisory Action dated Mar. 11, 2010", 3 pgs.
"U.S. Appl. No. 11/701,019, Examiner Interview Summary dated Nov. 16, 2010", 3 pgs.
"U.S. Appl. No. 11/701,019, Final Office Action dated Feb. 1, 2011", 17 pgs.
"U.S. Appl. No. 11/701,019, Final Office Action dated Dec. 14, 2009", 20 pgs.
"U.S. Appl. No. 11/701,019, Non Final Office Action dated May 15, 2009", 12 pgs.
"U.S. Appl. No. 11/701,019, Non-Final Office Action dated Aug. 4, 2010", 17 pgs.
"U.S. Appl. No. 11/701,019, Response filed Feb. 15, 2010 to Final Office Action dated Dec. 14, 2009", 13 pgs.
"U.S. Appl. No. 11/701,019, Response filed Apr. 14, 2010 to Advisory Action dated Mar. 11, 2010", 15 pgs.
"U.S. Appl. No. 11/701,019, Response filed May 2, 2011 to Final Office Action dated Feb. 1, 2011", 12 pgs.
"U.S. Appl. No. 11/701,019, Response filed Aug. 17, 2009 to Non Final Office Action dated May 15, 2009", 13 pgs.
"U.S. Appl. No. 11/701,019, Response filed Nov. 15, 2010 to Non Final Office Action dated Aug. 4, 2010", 13 pgs.
"U.S. Appl. No. 11/773,673, Final Office Action dated Aug. 27, 2010", 11 pgs.
"U.S. Appl. No. 11/773,673, Final Office Action dated Sep. 15, 2009", 14 pgs.
"U.S. Appl. No. 11/773,673, Final Office Action dated Sep. 23, 2008", 9 pgs.
"U.S. Appl. No. 11/773,673, Final Office Action dated Dec. 5, 2012", 26 pgs.
"U.S. Appl. No. 11/773,673, Non Final Office Action dated May 31, 2012", 19 pgs.
"U.S. Appl. No. 11/773,673, Non-Final Office Action dated Jan. 15, 2010", 12 pgs.
"U.S. Appl. No. 11/773,673, Non-Final Office Action dated Feb. 28, 2008", 10 pgs.
"U.S. Appl. No. 11/773,673, Non-Final Office Action dated Mar. 4, 2009", 13 pgs.
"U.S. Appl. No. 11/773,673, Response filed Jan. 23, 2009 to Final Office Action dated Sep. 23, 2008", 12 pgs.
"U.S. Appl. No. 11/773,673, Response filed Jan. 27, 2011 to Final Office Action dated Aug. 27, 2010", 12 pgs.
"U.S. Appl. No. 11/773,673, Response filed Apr. 5, 2013 to Final Office Action dated Dec. 5, 2012", 13 pgs.

(56) References Cited

OTHER PUBLICATIONS

"U.S. Appl. No. 11/773,673, Response filed Jun. 4, 2009 to Non Final Office Action dated Mar. 4, 2009", 14 pgs.
"U.S. Appl. No. 11/773,673, Response filed Jun. 10, 2008 to Non-Final Office Action dated Feb. 28, 2008", 9 pgs.
"U.S. Appl. No. 11/773,673, Response filed Jun. 15, 2010 to Non Final Office Action dated Jan. 15, 2010", 10 pgs.
"U.S. Appl. No. 11/773,673, Response filed Oct. 1, 2012 to Non Final Office Action dated May 31, 2012", 12 pgs.
"U.S. Appl. No. 11/773,673, Response filed Nov. 13, 2009 to Final Office Action dated Sep. 15, 2009", 13 pgs.
"U.S. Appl. No. 11/774,671, Appeal Brief dated Apr. 29, 2013", 33 pgs.
"U.S. Appl. No. 11/774,671, Decision on Pre-Appeal Brief Request dated Mar. 20, 2013", 2 pgs.
"U.S. Appl. No. 11/774,671, Examiner's Answer to Appeal Brief dated May 24, 2013", 18 pgs.
"U.S. Appl. No. 11/774,671, Final Office Action dated Jul. 9, 2010", 10 pgs.
"U.S. Appl. No. 11/774,671, Final Office Action dated Oct. 30, 2012", 13 pgs.
"U.S. Appl. No. 11/774,671, Non Final Office Action dated Apr. 9, 2012", 13 pgs.
"U.S. Appl. No. 11/774,671, Non-Final Office Action dated Dec. 11, 2009", 11 pgs.
"U.S. Appl. No. 11/774,671, Pre-Appeal Brief Request dated Feb. 28, 2013", 5 pgs.
"U.S. Appl. No. 11/774,671, Reply Brief dated May 30, 2013", 5 pgs.
"U.S. Appl. No. 11/774,671, Response filed Apr. 12, 2010 to Non Final Office Action dated Dec. 11, 2009", 10 pgs.
"U.S. Appl. No. 11/774,671, Response filed Aug. 9, 2012 to Non Final Office Action dated Apr. 9, 2012", 12 pgs.
"U.S. Appl. No. 11/774,671, Response filed Nov. 8, 2010 to Final Office Action dated Jul. 9, 2010", 10 pgs.
"U.S. Appl. No. 11/807,259, Examiner Interview Summary dated Jan. 12, 2012", 3 pgs.
"U.S. Appl. No. 11/807,259, Final Office Action dated May 31, 2012", 17 pgs.
"U.S. Appl. No. 11/807,259, Non Final Office Action dated Mar. 4, 2011", 13 pgs.
"U.S. Appl. No. 11/807,259, Response filed Jul. 5, 2011 to Non Final Office Action dated Mar. 4, 2011", 9 pgs.
"U.S. Appl. No. 11/807,259, Response filed Oct. 1, 2012 to Final Office Action dated May 31, 2012", 9 pgs.
"U.S. Appl. No. 12/347,887, Final Office Action dated Apr. 26, 2010", 10 pgs.
"U.S. Appl. No. 12/347,887, Final Office Action dated Aug. 23, 2012", 11 pgs.
"U.S. Appl. No. 12/347,887, Non Final Office Action dated Jan. 17, 2012", 11 pgs.
"U.S. Appl. No. 12/347,887, Non-Final Office Action dated Sep. 23, 2009", 11 pgs.
"U.S. Appl. No. 12/347,887, Response filed Jan. 23, 2013 to Final Office Action dated Aug. 23, 2012", 13 pgs.
"U.S. Appl. No. 12/347,887, Response filed Jun. 18, 2012 to Non Final Office Action dated Jan. 17, 2012", 13 pgs.
"U.S. Appl. No. 12/347,887, Response filed Sep. 24, 2010 to Final Office Action dated Apr. 26, 2010", 11 pgs.
"U.S. Appl. No. 12/347,887, Response filed Dec. 23, 2009 to Non Final Office Action dated Sep. 23, 2009", 10 pgs.
"U.S. Appl. No. 12/347,893, Final Office Action dated Apr. 21, 2010", 10 pgs.
"U.S. Appl. No. 12/347,893, Non-Final Office Action dated Oct. 1, 2009", 11 pgs.
"U.S. Appl. No. 12/347,893, Response filed Feb. 1, 2010 to Non Final Office Action dated Oct. 1, 2009", 10 pgs.
"U.S. Appl. No. 12/347,893, Response filed Aug. 20, 2010 to Final Office Action dated Apr. 21, 2010", 11 pgs.

"U.S. Appl. No. 12/940,715, Final Office Action dated Jul. 26, 2011", 22 pgs.
"U.S. Appl. No. 12/940,715, Non Final Office Action dated Dec. 9, 2010", 19 pgs.
"U.S. Appl. No. 12/940,715, Notice of Allowance dated Feb. 13, 2012", 9 pgs.
"U.S. Appl. No. 12/940,715, Notice of Allowance dated Mar. 14, 2012", 9 pgs.
"U.S. Appl. No. 12/940,715, Response filed May 6, 2011 to Non Final Office Action dated Dec. 9, 2010", 12 pgs.
"U.S. Appl. No. 12/940,715, Response filed Nov. 28, 2011 to Final Office Action dated Jul. 26, 2011", 13 pgs.
"Australia Application Serial No. 2008275636, Office Action Response filed Jul. 13, 2011", 19 pgs.
"Australian Application Serial No. 20011244971, Amendment dated Mar. 23, 2012", 9 pgs.
"Australian Application Serial No. 2005294745, Subsequent Examiner Report dated Jul. 20, 2010", 2 pgs.
"Australian Application Serial No. 2007269597, First Examination Report dated Feb. 3, 2010", 2 Pages.
"Australian Application Serial No. 2007269597, Office Action Response filed Jun. 28, 2010", 9 pgs.
"Australian Application Serial No. 2007269597, Response filed Jan. 7, 2011 to Examiner's Second Report dated Jul. 20, 2010", 18 pgs.
"Australian Application Serial No. 2011201585, First Examiners Report dated Aug. 8, 2011", 2 pgs.
"Australian Application Serial No. 2011201585, Response filed Jan. 13, 2012 to Office Action dated Aug. 8, 2011", 13 pgs.
"Australian Application Serial No. 2011244971, First Examination Report dated Jul. 12, 2013", 2 pgs.
"Australian Application Serial No. 2008275636, First Examiner Report dated Mar. 10, 2011", 2 pgs.
"Canadian Application Serial No. 2,656,935, Office Action dated Mar. 30, 2012", 3 pgs.
"Canadian Application Serial No. 2,656,935, Response filed Sep. 14, 2012 to Office Action dated Mar. 30, 2012", 16 pgs.
"Canadian Application Serial No. 2,693,675, Office Action dated Apr. 16, 2012", 4 pgs.
"Canadian Application Serial No. 2,693,675, Response filed Oct. 5, 2012 to Office Action dated Apr. 16, 2012", 16 pgs.
"Chinese Application Serial No. 200780032999.6, Office Action dated Jan. 26, 2011", 10 pgs.
"Chinese Application Serial No. 200780032999.6, Rejection Decision dated Mar. 23, 2012", With English Translation, 10 pgs.
"Chinese Application Serial No. 200780032999.6, Response filed Jun. 7, 2011 to Office Action dated Jan. 26, 2011", 10 pgs.
"European Application Serial No. 07793396.8, Decision to Refuse dated Jun. 5, 2011", 10 pgs.
"European Application Serial No. 07796696.8, European Search Report dated Sep. 28, 2009", 7 pgs.
"European Application Serial No. 07796696.8, Office Action dated Dec. 22, 2009", 1 pg.
"European Application Serial No. 07796696.8, Response filed Jun. 4, 2010 to Office Action dated Dec. 22, 2009", 17 pgs.
"European Application Serial No. 07796696.8, Written Submissions filed Feb. 28, 2011 to Summon to Attend Oral Proceedings dated Dec. 29, 2010", 15 pgs.
"European Application Serial No. Dec. 29, 2010, Summons to Attend Oral Proceedings dated Dec. 29, 2010", 6 pgs.
"International Application Serial No. PCT/US2007/011992, International Preliminary Report on Patentability dated Dec. 24, 2008", 8 pgs.
"International Application Serial No. PCT/US2007/015494, International Preliminary Report on Patentability dated Jan. 15, 2009", 5 pgs.
"International Application Serial No. PCT/US2007/011992, Search Report dated Jul. 15, 2008", 4 pgs.
"International Application Serial No. PCT/US2007/011992, Written Opinion dated Jul. 15, 2008.", P237, 5 pgs.
"International Application Serial No. PCT/US2007/015494, Search Report dated Mar. 21, 2008", 3 pgs.
"International Application Serial No. PCT/US2007/015494, Written Opinion, dated Mar. 21, 2008", 6 pgs.

(56) References Cited

OTHER PUBLICATIONS

"International Application Serial No. PCT/US2008/008431, International Preliminary Report on Patentability dated Jan. 21, 2010", 8 pgs.
"International Application Serial No. PCT/US2008/008431, International Search Report dated Oct. 1, 2008", 2 pgs.
"International Application Serial No. PCT/US2008/008431, Written Opinion dated Oct. 1, 2008", 5 pgs.
"Korean Application Serial No. 2009-7002266—Notice of the Final Rejection dated Jul. 27, 2011", w/English Translation, 4 pgs.
"Korean Application Serial No. 2009-7002266, Argument filed Jan. 17, 2011 against office action dated Nov. 16, 2010", 39 pgs.
"Korean Application Serial No. 2009-7002266, Decision to Grant dated May 1, 2013", with English translation, 3 pgs.
"Korean Application Serial No. 2009-7002266, Office Action dated Nov. 16, 2010", 9 pgs.
"Korean Application Serial No. 2009-7002266, Response filed Oct. 27, 2011 to Final Office Action dated Aug. 4, 2011", 43 pgs.
"Korean Application Serial No. 2009-7002266, Trial Decision dated Mar. 29, 2013", with English translation, 26 pgs.
"Korean Application Serial No. 2009-7002266, Written Report of Re-Examination dated Dec. 19, 2011", 5 pgs.
"U.S. Appl. No. 11/773,673, Final Office Action dated Mar. 11, 2015", 25 pgs.
"U.S. Appl. No. 11/773,673, Non Final Office Action dated Jul. 10, 2014", 21 pgs.
"U.S. Appl. No. 11/773,673, Response filed Jan. 12, 2015 to Non Final Office Action dated Jul. 10, 2014", 17 pgs.
"U.S. Appl. No. 11/773,673, Response filed Aug. 11, 2015 to Final Office Action dated Mar. 11, 2015", 16 pgs.
"U.S. Appl. No. 11/807,259, Final Office Action dated Mar. 27, 2015", 11 pgs.
"U.S. Appl. No. 11/807,259, Non Final Office Action dated Sep. 16, 2014", 19 pgs.
"U.S. Appl. No. 11/807,259, Response filed Mar. 16, 2015 to Non Final Office Action dated Sep. 16, 2014", 14 pgs.
"U.S. Appl. No. 11/807,259, Response filed Sep. 25, 2015 to Final Office Action dated Mar. 27, 2015", 14 pgs.
"U.S. Appl. No. 12/347,887, Final Office Action dated Jun. 25, 2014", 15 pgs.
"U.S. Appl. No. 12/347,887, Non Final Office Action dated Aug. 24, 2015", 19 pgs.
"U.S. Appl. No. 12/347,887, Response filed Dec. 26, 2014 to Final Office Action dated Jun. 25, 2014", 13 pgs.
"U.S. Appl. No. 12/347,893, Non Final Office Action dated Sep. 2, 2015", 17 pgs.
"U.S. Appl. No. 12/347,893, Response filed Dec. 8, 2014 to Final Office Action dated Jun. 6, 2014", 13 pgs.
"Australian Application Serial No. 2011244971, Response filed Jul. 8, 2014", 9 pgs.
"Australian Application Serial No. 2014203798, Office Action dated Mar. 26, 2015", 2 pgs.
"Australian Application Serial No. 2014203798, Response filed Jul. 3, 2015", 8 pgs.
"Canadian Application Serial No. 2,656,935, Office Action dated Mar. 12, 2015", 3 pgs.
"Canadian Application Serial No. 2,656,935, Response filed Aug. 7, 2014 to Office Action dated Feb. 7, 2014", 14 pgs.
"Canadian Application Serial No. 2,656,935, Response filed to Sep. 14, 2015 to Office Action dated Mar. 12, 2015", 13 pgs.
"Canadian Application Serial No. 2,693,675, Office Action dated Apr. 1, 2015", 4 pgs.
"Canadian Application Serial No. 2,693,675, Response filed Sep. 30, 2015", 22 pgs.
"European Application Serial No. 07796696.8, Appeal Board Opinion dated Nov. 11, 2014", 3 pgs.
"European Application Serial No. 07796696.8, Response filed Sep. 15, 2011", 14 pgs.
"European Application Serial No. 11195428.5, Communication Pursuant to Article 94(3) EPC dated Jan. 28, 2016", 7 pgs.
"Indian Application Serial No. 696/DELNP/2009, First Examiner Report dated Sep. 29, 2015", in English, 2 pgs.
"Australian Application Serial No. 2015246138, Response filed Aug. 16, 2016 to First Examiner's Report dated May 12, 2016", 8 pgs.
"Canadian Application Serial No. 2,693,675, Office Action dated Nov. 30, 2016", 3 pgs.
"Canadian Application Serial No. 2,693,675, Office Action Response dated Aug. 30, 2016", 9 pgs.
"Indian Application Serial No. 182/DELNP/2010, First Examiners Report dated Jul. 5, 2017", 5 pgs.
Final Office Action received for U.S. Appl. No. 11/807,259, dated Jun. 21, 2017, 10 pages.
Non-Final Office Action received for U.S. Appl. No. 11/807,259, dated Dec. 8, 2016, 9 pages.
Response to Non-Final Office Action filed on May 8, 2017 for U.S. Appl. No. 11/807,259, dated Dec. 8, 2016, 13 pages.
Response to First Examination Report filed on Nov. 2, 2017 for Indian Patent Application No. 182/DELNP/2010, dated Jul. 5, 2017, 22 pages.
Response to Office Action filed on Jul. 8, 2014 for Australian Patent Application No. 2011244971, dated Jul. 12, 2013, 9 pages.
First Examination Report received for Australian Patent Application No. 2015246138, dated May 12, 2016, 2 pages.
Office Action received for Canadian Patent Application No. 2,693,675, dated Mar. 1, 2016, 4 pages.
Office Action received for Canadian Patent Application No. 2,693,675, dated Oct. 25, 2017, 5 pages.
Response to Office Action filed on Dec. 5, 2016 for Canadian Patent Application No. 2,693,675, dated Nov. 30, 2016, 9 pages.
312 Amendment filed dated Nov. 21, 2019 for U.S. Appl. No. 13/495,840, 4 pages.
Appeal Brief dated Jan. 16, 2018, for U.S. Appl. No. 13/495,840, 17 pages.
Final Office Action Received for U.S. Appl. No. 13/495,840 dated Aug. 16, 2017, 19 pages.
Final Office Action Received for U.S. Appl. No. 13/495,840, dated Aug. 1, 2013, 14 pages.
Final Office Action received for U.S. Appl. No. 13/495,840, dated Dec. 31, 2014, 22 pages.
Non-Final Office Action received for U.S. Appl. No. 13/495,840, dated Jul. 24, 2015, 17 pages.
Non-Final Office Action received for U.S. Appl. No. 13/495,840, dated Mar. 17, 2014, 14 pages.
Non-Final Office Action received for U.S. Appl. No. 13/495,840, dated Oct. 2, 2012, 18 pages.
Non-Final Office Action received for U.S. Appl. No. 13/495,840, dated Oct. 3, 2016, 19 pages.
Response to Final Office Action filed on Feb. 3, 2014 for U.S. Appl. No. 13/495,840, dated Aug. 1, 2013, 11 pages.
Response to Final Office Action filed on Jun. 30, 2015, for U.S. Appl. No. 13/495,840, dated Dec. 31, 2014, 11 pages.
Response to Non-Final Office Action filed on Jan. 22, 2016, for U.S. Appl. No. 13/495,840, dated Jul. 24, 2015, 12 pages.
Response to Non-Final Office Action filed on Mar. 3, 2017, for U.S. Appl. No. 13/495,840, dated Oct. 3, 2016, 11 pages.
Response to Non-Final Office Action filed on Mar. 4, 2013, for U.S. Appl. No. 13/495,840, dated Oct. 2, 2012, 11 pages.
Response to Non-Final Office Action filed on Sep. 17, 2014, for U.S. Appl. No. 13/495,840, dated Mar. 17, 2014, 11 pages.
Appeal Decision received for U.S. Appl. No. 13/495,840, dated Jun. 6, 2019, 9 pages.
Corrected Notice of Allowability Received for U.S. Appl. No. 13/495,840, dated Dec. 16, 2019, 5 pages.
Examiner Answer to Appeal Brief received for U.S. Appl. No. 13/495,840, dated May 3, 2018, 10 pages.
Notice Of Allowance received for U.S. Appl. No. 13/495,840, dated Aug. 21, 2019, 6 pages.
Notice Of Allowance received for U.S. Appl. No. 13/495,840, dated Jul. 2, 2019, 21 pages.
PTO Response to Rule 312 Communication received for U.S. Appl. No. 13/495,840, dated Nov. 29, 2019, 2 pages.

(56) References Cited

OTHER PUBLICATIONS

Reply Brief filed on Jul. 3, 2018, for U.S. Appl. No. 13/495,840, 5 pages.
Appeal Decision received for U.S. Appl. No. 11/774,671, dated Mar. 1, 2016, 8 pages.

* cited by examiner

SYSTEM AND METHOD FOR CONTEXTUAL ADVERTISING AND MERCHANDIZING BASED ON USER CONFIGURABLE PREFERENCES

CLAIM OF PRIORITY

This application is a continuation of U.S. application Ser. No. 11/774,671 filed Jul. 9, 2007, which application is incorporated in its entirety herein by reference.

BACKGROUND

Technical Field

This disclosure relates to methods and systems supporting online advertising and online transactions by a user. More particularly, the present disclosure relates to contextual advertising and merchandizing based on user configurable preferences.

Related Art

An increasingly popular way of delivering Internet advertisements is to tie the presentation of advertisements to particular user behaviors and/or user profiles, and/or user demographics. Such user behaviors include user access to a particular web page, user selection (also called mouse-clicking or clicking) of a particular location on a web page, user entry of a particular search string or keyword, and the like. In order to target advertising accurately, advertisers or vendors pay to have their advertisements presented in response to certain kinds of events—that is, their advertisements are presented when particular user behaviors warrant such presentation. If a particular advertisement (ad) leads to some user action, an advertiser may receive remuneration for the ad.

Using other systems and processes on the Web, users can search for goods and services via the Internet and shop or make purchases of goods or services over the Internet. Unfortunately, conventional systems have not been able to create an effective way of extracting keywords from web pages and create contextual advertisements that may lead to a user purchase transaction.

Some conventional web-based merchants use affiliate programs. In an affiliate program, the merchant itself must track purchase transactions and reward $3^{rd}$ party affiliates when purchase transactions are completed. This transaction tracking and rewarding process imposes a significant administrative burden on the merchant. Moreover, the tracking/reward functionality must be replicated for each merchant that chooses to use such a system. Current technology does not provide a solution for off-loading this tracking/reward functionality to a $3^{rd}$ party without risking an increase in fraudulent transactions and a decrease in the time-efficiency of processing purchase transactions.

U.S. Pat. No. 5,948,061 discloses methods and apparatuses for targeting the delivery of advertisements over a network such as the Internet. Statistics are compiled on individual users and networks and the use of the advertisements is tracked to permit targeting of the advertisements of individual users. In response to requests from affiliated sites, an advertising server transmits to people accessing the page of a site an appropriate one of the advertisements based upon profiling of users and networks. However, the user is not offered the opportunity to opt-out of the advertising or to configure the preferences or profile that was automatically created based on user activity.

Thus, a system and method for contextual advertising and merchandizing based on user configurable preferences is needed.

BRIEF DESCRIPTION OF THE DRAWINGS

Embodiments illustrated by way of example and not limitation in the figures of the accompanying drawings, in which.

DETAILED DESCRIPTION

A computer-implemented system and method for contextual advertising and merchandizing based on user configurable preferences is disclosed. In the following description, numerous specific details are set forth. However, it is understood that embodiments may be practiced without these specific details. In other instances, well-known processes, structures and techniques have not been shown in detail in order not to obscure the clarity of this description.

As described further below, according to various example embodiments of the disclosed subject matter described and claimed herein, there is provided a computer-implemented system and method for contextual advertising and merchandizing based on user configurable preferences. The system includes an advertising (ad) preferences service to obtain user preference information related to advertising and to modify the presentation of advertising to the user based upon the user preference information. Various embodiments are described below in connection with the figures provided herein.

Typical contextual advertising implementations show advertisements that are textually related to the content that the user is browsing or has browsed. In newer systems, behavioral information and day parting is used to improve upon the contextual advertising. Other systems enhance contextual advertising with user demography gleaned from various sources. In these example embodiments, the advertisements shown are not necessarily related to the context of the content; rather, the advertisements shown can be related to a merchandizing opportunity based on a user's automatically determined demographic profile to create a new dimension in contextual advertising. Such a new dimension in contextual advertising leverages user demographic information obtained in previous user interactions unrelated to the current user interaction or behavior.

By observing search, view, bid, buy, payment and other activities of known user demographies, a host system can use various heuristics to generate associations between user demographic profiles and Item Groups, with associated levels of interest of users of those demographic profiles in that Item Group. Item Groups may represent Products, Services, or other web items. Demographic profiles may be aggregated along one or more dimensions (e.g. age, gender, location, etc.). Item Groups may also be aggregated along one or more dimensions (e.g. category, price, vendor, payment method, etc.). The term Item Group may also represent items for sale as well as web pages/sections, and/or sites.

As the description above indicates, targeted advertising has become more complex. However, even the best algorithms for targeting ad content to particular users can produce errant or annoying ad content that may not be considered relevant or useful to the user. As such, it would be beneficial to enable the user to configure the advertising-related parameters or profiles that have been automatically created by various systems that monitor user behaviors, collect demographic information, or otherwise associate users with particular types of ads. The various embodiments described herein enable the user to configure (e.g. edit, modify, select, de-select, enable, disable, etc.) various advertising-related parameters or preference information.

Figure 1:
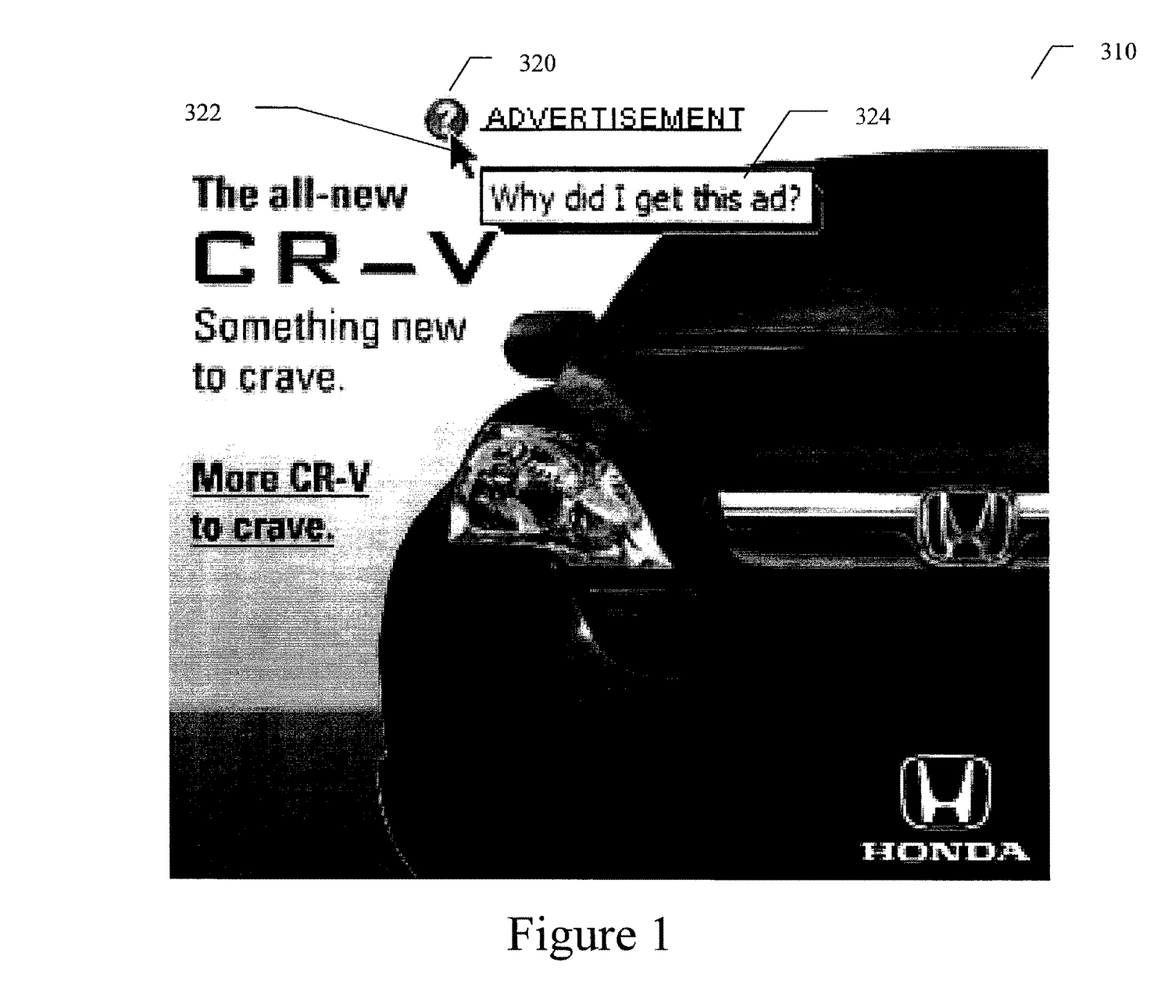
FIGS. 1 and 2 illustrate an example advertisement with the user selectable display object associated with the ad in an example embodiment.
Figure 2:
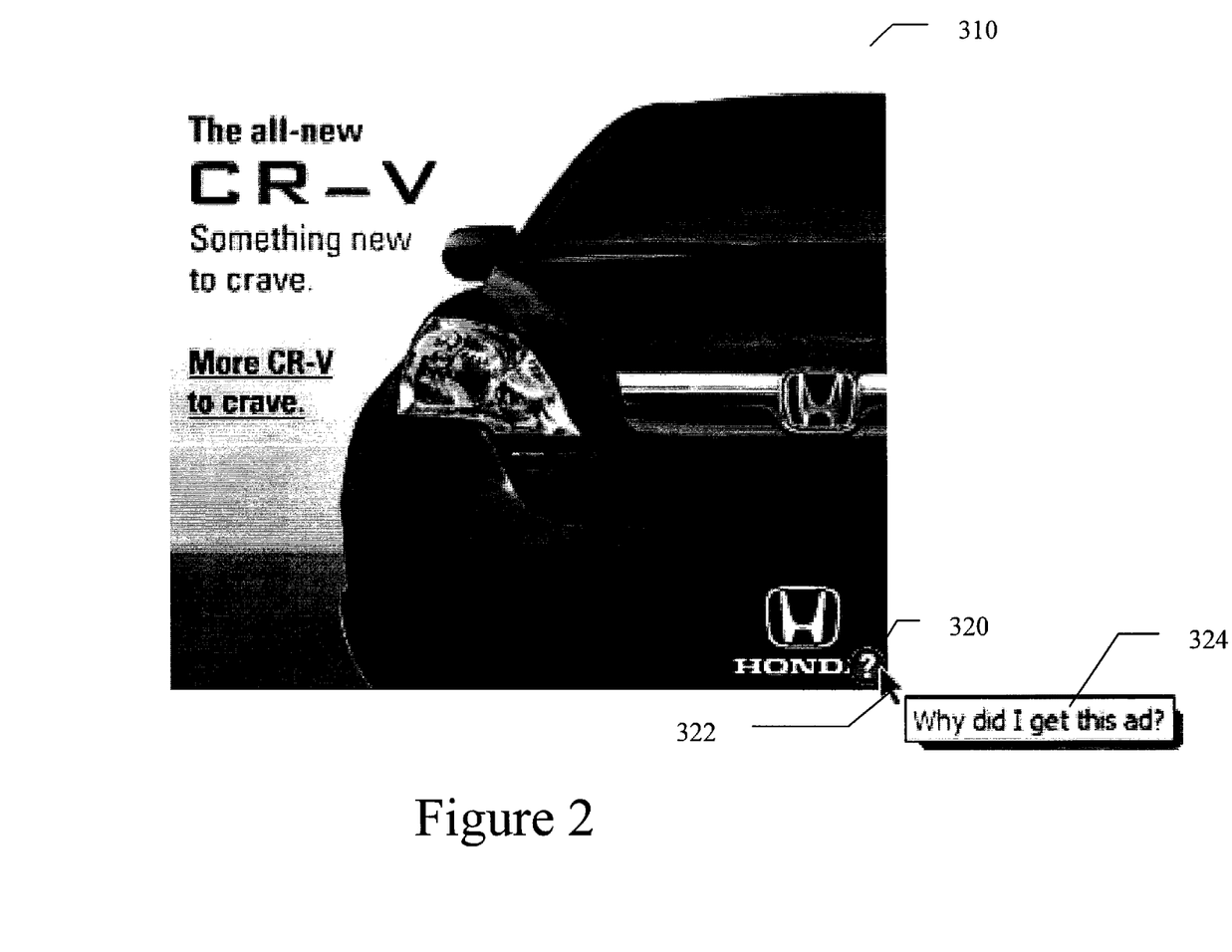

An example embodiment is described in the following section. Referring to FIGS. 1 and 2, an example advertisement 310 is illustrated. Ad 310 represents a typical ad displayed to an on-line computer user is conventional systems. Such an ad 310 may have been automatically selected for display to a particular user (i.e. targeted) because of the user's previous behavior or demographics. Conventional systems do not provide a way for the user to opt-out of the targeted advertising system. Further, conventional systems do not provide a way for the user to configure advertising parameters to increase the likelihood that subsequent targeted ads will be more relevant for the particular user.

Referring to FIGS. 1 and 2, an example embodiment includes a display object 320 that enables the user to configure advertising parameters. In one embodiment, display object 320 is a hyperlink that re-directs the user to a separate preferences configuration webpage when the user clicks on the display object 320. In another embodiment, the display object 320 can activate a preferences configuration box when the display object 320 is clicked or activated with a mouseover. In other embodiments, the display object 320 can cause the activation of a set of preferences checkboxes when the display object 320 is selected and right-clicked. Many other alternative implementations can be used to indicate the selection and/or activation of display object 320 thereby activating the enables the functionality of various embodiments to enable a user to configure advertising parameters. In yet other embodiments, the activation of advertising configuration functionality can be offered as part of a tool bar or drop-down menu selection associated with the configuration of other system parameters. In the particular embodiment shown in FIGS. 1 and 2, the display object 320 is a link that redirects the user to a separate preference configuration webpage when a user clicks on the display object 320. In addition, the particular embodiment shown in FIGS. 1 and 2 provides additional information for the user when a user performs a mouseover on the display object 320. As shown in FIGS. 1 and 2, the user has performed a mouseover of display object 320 by position cursor 322 in a proximate position to display object 320. As a result, an information box 324 has been displayed for the user to explain the purpose of display object 320. If the user clicks on the display object 320 while cursor 322 is in a proximate position to display object 320, the user will be redirected to a separate webpage, such as the webpage 410 shown in FIG. 3 and described below.

FIG. 1 illustrates and embodiment in which the display object 320 is displayed outside of the borders of the underlying ad 310. In this embodiment, no portion of the ad 310 is obscured by display object 320. An alternative embodiment is shown in FIG. 2. In FIG. 2, the display object 320 is shown overlaid on a portion of the underlying ad 310. In this embodiment, the display object 320 can appear as a watermark on the ad 310. It will be apparent to those of ordinary skill in the art that either of these particular implementations and equivalent embodiments can be used to enable a user to configure advertising parameters.

Figure 3:
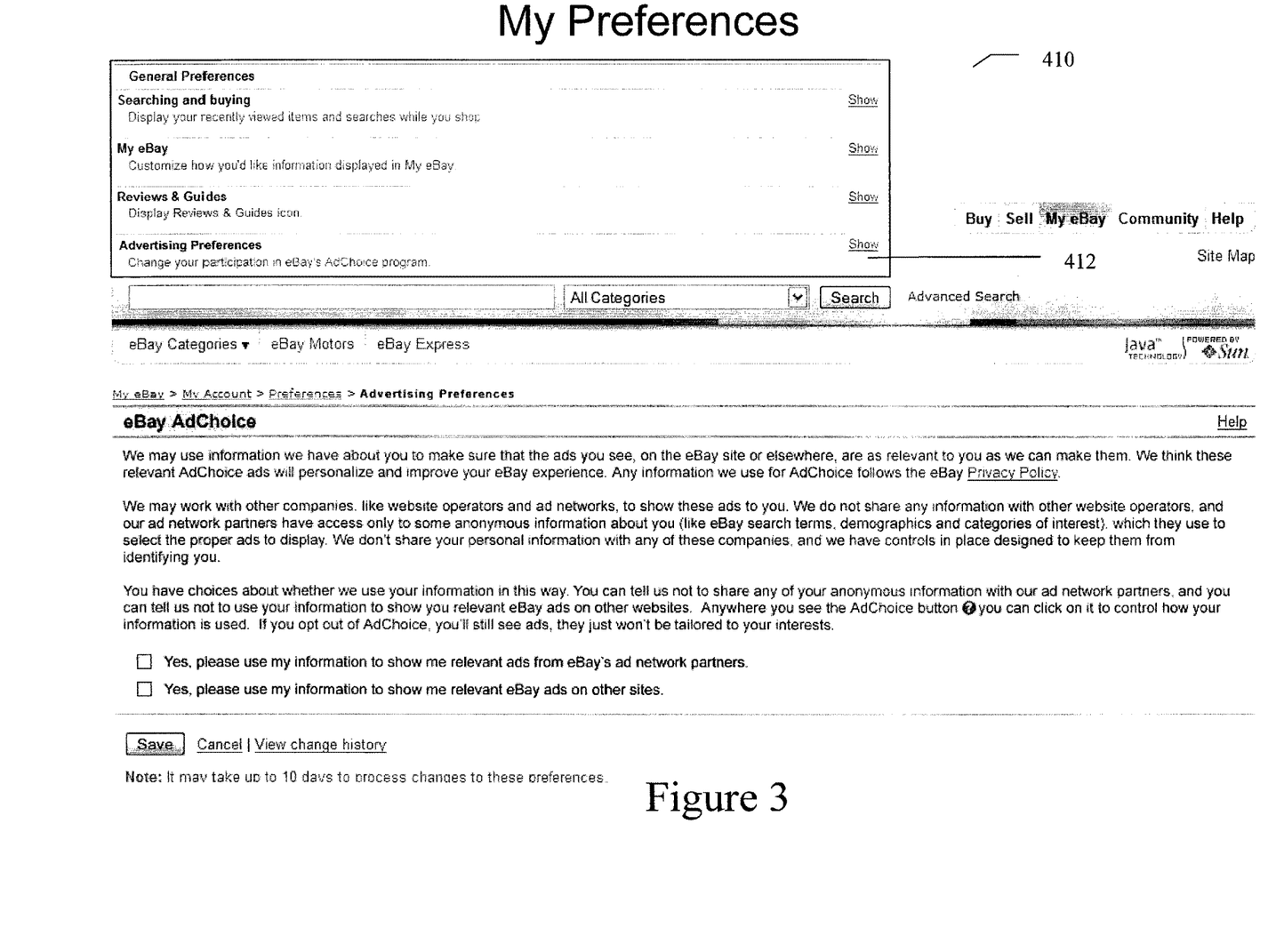
FIG. 3 illustrates an example embodiment of a preferences webpage displayed to a user when the user activates the display object.

Referring now to FIG. 3, an example embodiment illustrates a preferences webpage displayed to a user when the user activates the display object 320 using any of the various methods described above. In an example embodiment, preferences page 410 includes a portion 412 (e.g. a link) that enables a user to link to a separate page used to configure advertising preferences. If the user clicks on the portion 412 while the cursor is in a proximate position to portion 412, the user will be redirected to a separate webpage, such as the webpage 510 shown in FIG. 4 and described below. In an alternative embodiment, the user can be linked directly to webpage 510 when the user activates the display object 320 using any of the various methods described above.

Figure 4:
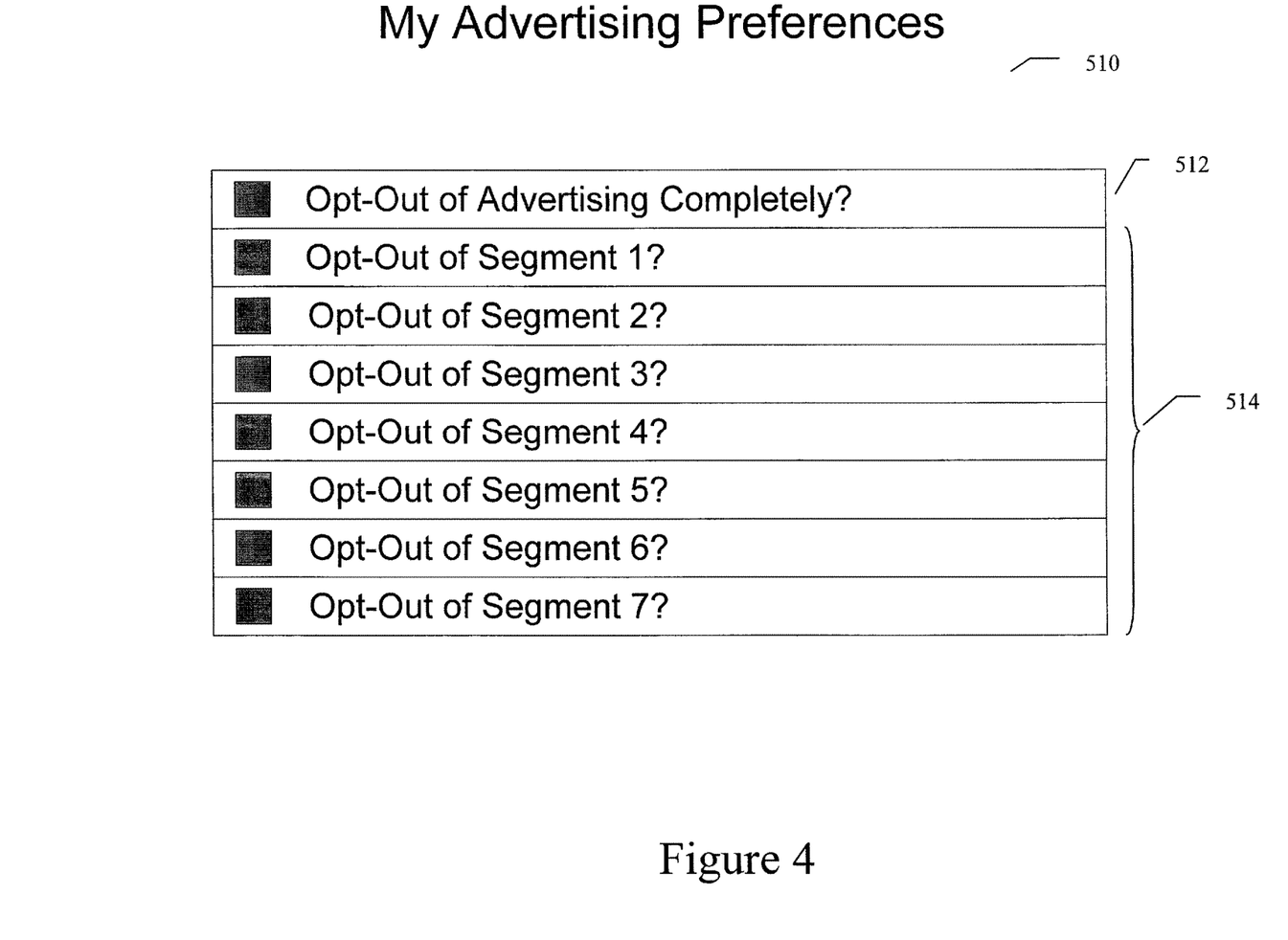
FIG. 4 illustrates an example embodiment of a webpage used to configure user advertising preferences.

Referring now to FIG. 4, an example embodiment of a webpage used to configure user advertising preferences is illustrated. In one embodiment, the user is presented with a webpage 510 upon activation of display object 320 as described above. It will be apparent to those of ordinary skill in the art that page 510 may equivalently be implemented as a dialog box, a pull-down menu, or other type of user interface for receiving a set of preference selections. In the example embodiment shown in FIG. 4, the user may select or de-select (i.e. enable/activate or disable/deactivate) a set of advertising-related parameters or preferences. These user-configurable advertising-related parameters or preferences can include an opt-out selection 512. The opt-out control allows a user to specify whether or not s/he wants to participate in targeted advertising. If the user selects "opt-out" at selection 512 by clicking and marking the associated shaded box, the user's profile information is not used or provided for use by others for the purpose of targeted advertising. If the user de-selects "opt-out" at selection 512 by clicking and un-marking the associated shaded box, the user's profile information can be used or provided for use by others for the purpose of targeted advertising.

In the example embodiment shown in FIG. 4, the user may also select or de-select (i.e. enable/activate or disable/deactivate) a set of advertising-related segment parameters or preferences. Segments can be considered groupings into which a particular user has been automatically placed based on user behavior or demographics. For example, one segment may be based on gender; male users get classified in a male segment and female users get classified in a female segment. Other examples of segments include, age ranges, income ranges, location, marital status, parental status, historical buying habits, etc. It is common in conventional systems to classify particular users into a plurality of segments for the purpose of targeted advertising. Given that a plurality of segments have been created for each particular user, page 510 provides an opportunity for the system to present the pre-defined user segments to the particular user with whom the segments are associated. In this manner, the user is given information defining how the user has been previously classified into a plurality of segments for the purpose of targeted advertising. These user-specific segment classifications can be displayed to the user in page 510 as a list of segments 514. Each segment is configured with a selectable shaded box with which the user may select or de-select (i.e. enable/activate or disable/deactivate) each of the plurality of advertising-related segments previously associated with the user. If the user selects a particular segment at segment options 514 by clicking and marking the associated shaded box, the user's segment classification for that segment can be used or provided for use by others for the purpose of targeted advertising. If the user de-selects a particular segment at segment options 514 by clicking and un-marking the associated shaded box, the user's segment classification for that segment is not used or provided for use by others for the purpose of targeted advertising. Further, a user can add or remove particular individual elements or demographic data to the user's individual profile. For example, a user could specify that s/he is interested in receiving information regarding financial offers. A plurality of profile parameters or preferences can be offered to a user for configuration by the user. In this manner, a user can configure a set of parameters or preferences associated with advertising.

Figure 5:
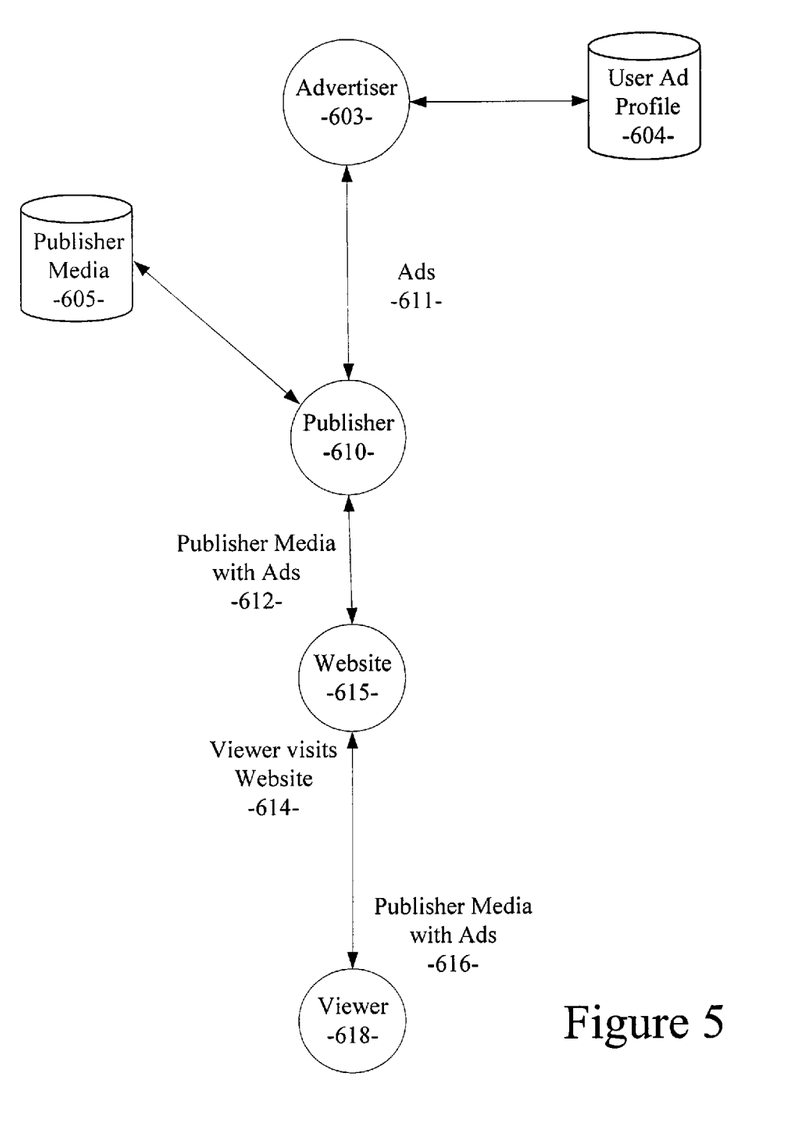
FIG. 5 illustrates a system architecture for delivering advertising to users in a networked system.

FIG. 5 illustrates a system architecture for delivering advertising to users in a networked system. Referring to FIG. 1, a system can provide techniques for manipulating networked content. For example, a publishing system 610 can be used to insert an advertisement (ad) 611 obtained from an advertiser 603 into publisher media 605 at a publisher website 615 (a website is one type of media or networked content). To accomplish this ad insertion, the publisher 610 can insert a piece of code provided by the advertising partner 603 into the publisher website's 615 source code. This code is then rendered when the page is viewed by a viewer 618 to display the publisher media with the advertisement in the location on the page indicated in the inserted code. Should the publisher 610 want to move or modify the ad, the publisher 610 changes the code at the site 615 to effect the change to the ad. The advertiser 603 can employ user ad profile information 604 to target a particular ad for a particular user viewing publisher media 605 via publisher website 615. User ad profile information 604 can be automatically created and updated with user behavior information and user demographics. In addition, the user ad profile information 604 can be used for the storage of the user-configurable set of parameters or preferences associated with advertising as described above. These user configurable preferences can be accessed and used by advertiser 603 when advertiser 603 determines which ad should be served to a particular user fia publisher 610. For example, if the "opt-out of advertising" parameter has been previously selected by a user as described above, the advertiser 603 can offer up an ad to publisher 610 that is not targeted per the selection request of the user. For another example, if the "opt-in to segment 1" parameter has been previously selected by a user as described above, the advertiser 603 can offer up an ad to publisher 610 that is targeted to individuals of segment 1 per the selection request of the user. In this manner, the ads shown to a particular user can be configured by a user by user manipulation of a set of user-configurable parameters or preferences associated with advertising as described above.

In an example embodiment described herein and shown by example in FIG. 5, the display object 320 used to enable user configuration of the advertising parameters can be inserted into the ad 611 by advertiser 603 or inserted into the publisher media content with inserted ad 612 by the publisher 610. In either case, the activation of the display object 320 by a user can cause a link to the appropriate host of the user-configurable parameters or preferences associated with advertising as described above.

Figure 6:
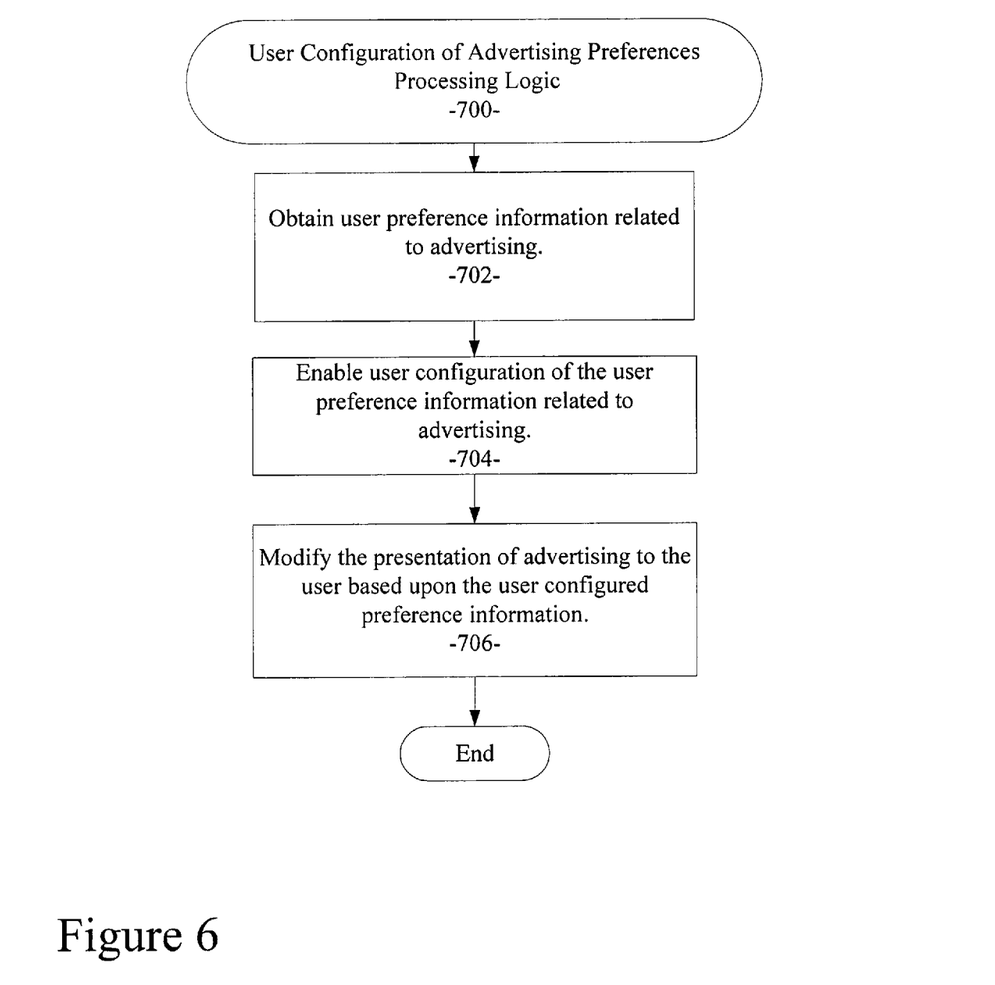
FIG. 6 is a processing flow diagram of an example embodiment.

FIG. 6 illustrates a processing flow for an example embodiment. The example embodiment includes an advertising (ad) preferences service to obtain user preference information related to advertising (processing block 702), enable user configuration of the user preference information related to advertising (processing block 704), and modify the presentation of advertising to the user based upon the user configured preference information (processing block 706).

Figure 7:
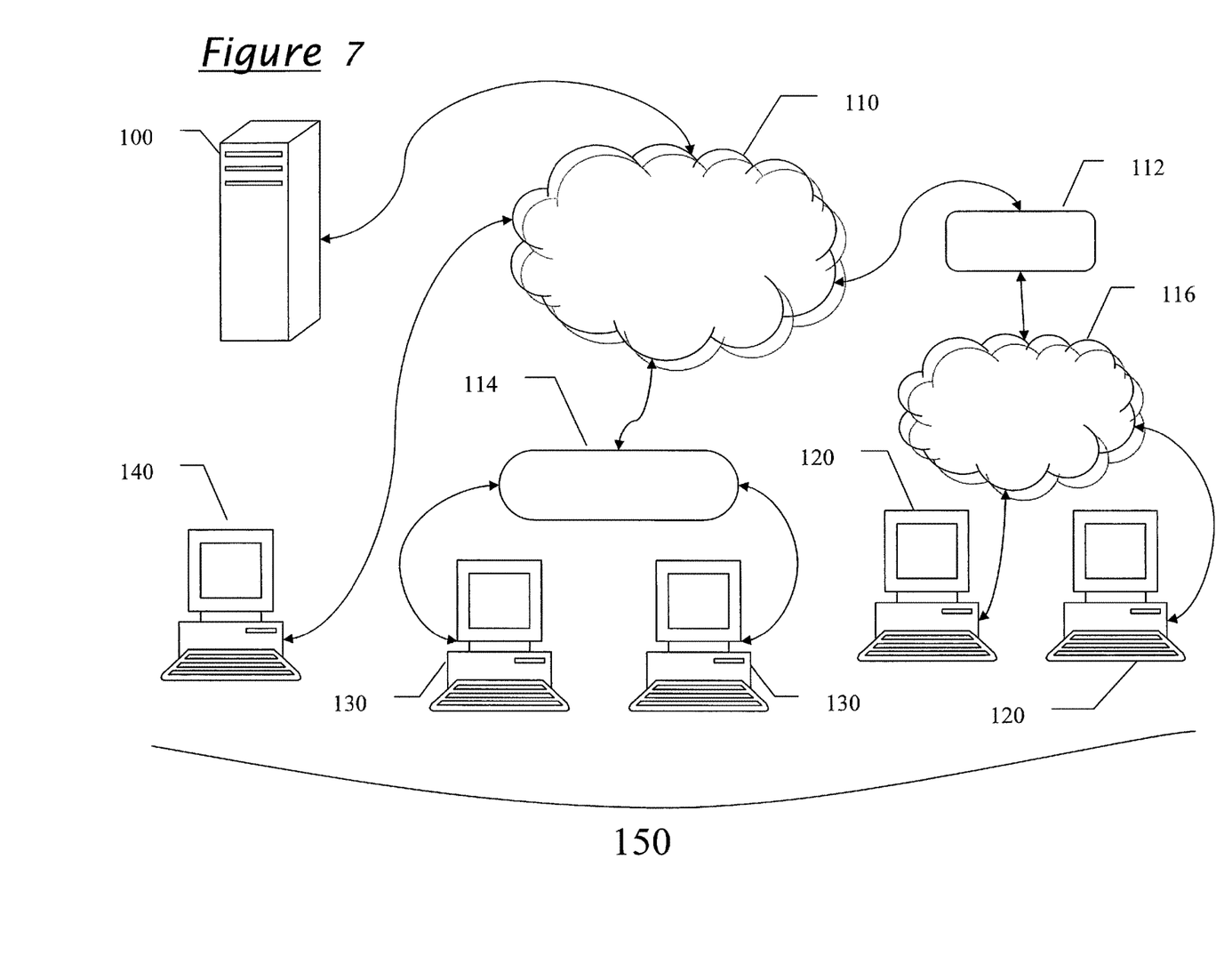
FIG. 7 is a block diagram of a network system on which an embodiment may operate.

Referring now to FIG. 7, a diagram illustrates a network environment in which various example embodiments may operate. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 150 may access image, graphical, and textual data provided by web server 100 or they may run Web application software. Conventional means exist by which clients 150 may supply information to web server 100 through the World Wide Web 110 and the web server 100 may return processed data to clients 150.

Figure 8:
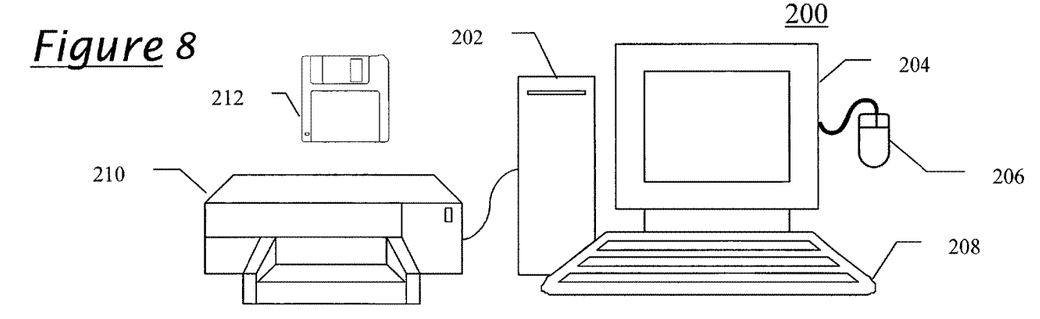
FIGS. 8 and 9 are block diagrams of an example computer system on which an embodiment may operate.
Figure 9:
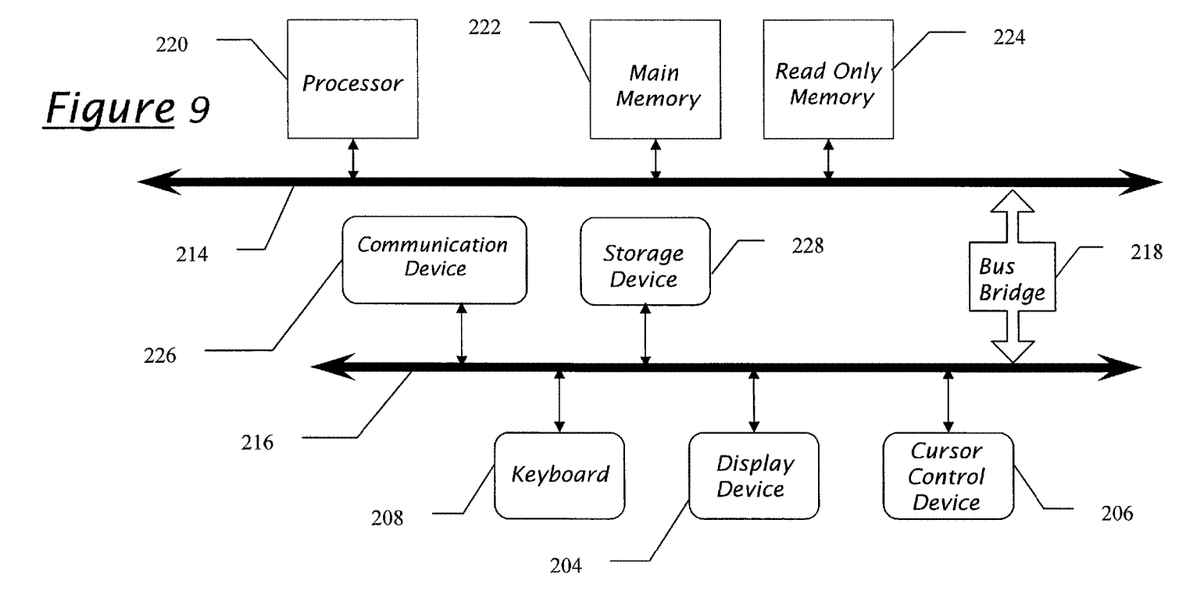

Having briefly described one embodiment of the network environment in which an example embodiment may operate, FIGS. 8 and 9 show an example of a computer system 200 illustrating an exemplary client 150 or server 100 computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the Palm Pilot™. Client 150 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 7 and described above.

The system of an example embodiment includes software, information processing hardware, and various processing steps, which will be described below. The features and process steps of example embodiments may be embodied in articles of manufacture as machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described herein. In particular, the use of embodiments with various types and formats of user interface presentations and/or application programming interfaces may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, a computer-implemented system and method for contextual advertising and merchandizing based on user configurable preferences is disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A method, comprising:
    obtaining behavior information for a user based on monitored interactions of the user with displayed content of one or more webpages;
    obtaining demographic information of the user from previous user interactions;
    obtaining content display preference information associated with the user, the content display preference information including the behavior information of the user and the demographic information of the user;
    associating the content display preference information with a profile associated with the user, the profile comprising a plurality of automatically generated information segments, wherein associating the content display preference information with the profile includes generating each information segment by automatically classifying the user into a particular category corresponding to the information segment based on the behavior information and the demographic information;
    displaying targeted content to the user in a first user interface comprising a first user interface element displayed in association with the targeted content, the first user interface element operable to direct the user to information regarding one or more segments associated with the user;
    responsive to receiving a selection of the first user interface element, displaying, on a computing device, a second user interface comprising a second user interface element operable to direct the user to content display preferences;
    responsive to receiving a selection of the second user interface element, redirecting the user to a third user interface, the third user interface comprising:
        information about a plurality of information segments associated with the profile;
        indications of the particular category that corresponds to each of the plurality of information segments; and
        third user interface elements displayed in association with each indication of the particular category and that are selectable to deactivate, in connection with providing targeted content, only a respective particular category into which the user was classified;

responsive to detecting input to select one of the third user interface elements, modifying the content display preference information by deactivating the respective particular category relative to which the selected third user interface element is displayed and keeping activated other respective particular categories; and providing updated targeted content to the user based on modified content display preference information, including targeting content to the user using activated respective particular categories and not using the deactivated respective particular category.

2. The method of claim 1, further comprising excluding content corresponding to the deactivated respective particular category from being presented to the user.

3. The method of claim 1, further comprising receiving input to activate a previously deactivated category and using the previously deactivated category for targeting the content to the user.

4. The method of claim 1, wherein the first user interface element comprises a selectable display object.

5. The method of claim 1, further comprising aggregating information in the profile with an additional profile associated with an additional user.

6. The method of claim 1, further comprising associating the plurality of automatically generated information segments with an additional profile associated with an additional user.

7. The method of claim 6, wherein the additional profile has similar demographic information to the profile.

8. A computer-readable hardware storage device having embedded therein a set of instructions that, when executed by one or more processors of a publishing system, cause the publishing system to perform operations comprising:

obtaining behavior information for a user based on monitored interactions of the user with displayed content of one or more webpages;

obtaining demographic information of the user from previous user interactions;

obtaining content display preference information associated with the user, the content display preference information including the behavior information of the user and the demographic information of the user;

associating the content display preference information with a profile associated with the user, the profile comprising a plurality of automatically generated information segments, wherein associating the content display preference information with the profile includes generating each information segment by automatically classifying the user into a particular category corresponding to the information segment based on the behavior information and the demographic information;

displaying targeted content to the user in a first user interface comprising a first user interface element displayed in association with the targeted content, the first user interface element operable to direct the user to information regarding one or more segments associated with the user;

responsive to receiving a selection of the first user interface element, displaying, on a computing device, a second user interface comprising a second user interface element operable to direct the user to content display preferences;

responsive to receiving a selection of the second user interface element, redirecting the user to a third user interface, the third user interface comprising:
information about a plurality of information segments associated with the profile;
indications of the particular category that corresponds to each of the plurality of information segments; and
third user interface elements displayed in association with each indication of the particular category and that are selectable to deactivate, in connection with providing targeted content, only a respective particular category into which the user was classified;

responsive to detecting input to select one of the third user interface elements, modifying the content display preference information by deactivating the respective particular category relative to which the selected third user interface element is displayed and keeping activated other respective particular categories; and providing updated targeted content to the user based on modified content display preference information, including targeting content to the user using activated respective particular categories and not using the deactivated respective particular category.

9. The computer-readable hardware storage device of claim 8, wherein the operations further comprise excluding content corresponding to a selected third information element from being presented to the user.

10. The computer-readable hardware storage device of claim 8, wherein the operations further comprise using a previously deactivated category for targeting content to the user responsive to receiving input to activate the previously deactivated category.

11. The computer-readable hardware storage device of claim 8, wherein the operations further include aggregating information in the profile with an additional profile associated with an additional user.

12. The computer-readable hardware storage device of claim 8, wherein the operations further comprise associating the plurality of automatically generated information segments with an additional profile associated with an additional user.

13. The computer-readable hardware storage device of claim 12, wherein the additional user has similar demographic information to the profile of the user.

14. The computer-readable hardware storage device of claim 13, wherein the operations further include obtaining the similar demographic information of the additional user from the previous user interactions of the additional user.

15. A system, comprising:
one or more processors; and
a memory storing instructions that, when executed by the one or more processors, perform operations including:
obtaining behavior information for a user based on monitored interactions of the user with displayed content of one or more webpages;
obtaining demographic information of the user from previous user interactions;
obtaining content display preference information associated with the user, the content display preference information including the behavior information of the user and the demographic information of the user;
associating the content display preference information with a profile associated with the user, the profile comprising a plurality of automatically generated information segments, wherein associating the content display preference information with the profile includes generating each information segment by automatically classifying the user into a particular category corresponding to the information segment based on the behavior information and the demographic information;

displaying targeted content to the user in a first user interface comprising a first user interface element displayed in association with the targeted content, the first user interface element operable to direct the user to information regarding one or more segments associated with the user;

responsive to receiving a selection of the first user interface element, displaying a second user interface comprising a second user interface element operable to direct the user to content display preferences;

responsive to receiving a selection of the second user interface element, redirecting the user to a third user interface, the third user interface comprising:
  information about a plurality of information segments associated with the profile;
  indications of the particular category that corresponds to each of the plurality of information segments; and
  third user interface elements displayed in association with each indication of the particular category and that are selectable to deactivate, in connection with providing targeted content, only a respective particular category into which the user was classified;

responsive to detecting input to select one of the third user interface elements, modifying the content display preference information by deactivating the respective particular category relative to which the selected third user interface element is displayed and keeping activated other respective particular categories; and providing updated targeted content to the user based on modified content display preference information, including targeting content to the user using activated respective particular categories and not using the deactivated respective particular category.

16. The system of claim 15, wherein the operations further comprise using a previously deactivated category for targeting content to the user responsive to receiving input to activate the previously deactivated category.

17. The system of claim 15, wherein the operations further include excluding content corresponding to a selected third user interface element from being presented to the user.

18. The system of claim 15, wherein the operations further include associating the plurality of automatically generated information segments with an additional profile associated with an additional user.

19. The system of claim 18, wherein the additional user has similar demographic information to the profile of the user.

20. The system of claim 15, wherein the operations further include aggregating information in the profile with an additional profile associated with an additional user.

* * * * *